Nov. 12, 1963 W. S. ASPEY ET AL 3,110,791

CIRCUIT INTERRUPTER WITH PRESSURE-GENERATING AND INTERRUPTING CONTACTS IN INSULATING INTERRUPTING TUBE

Filed Aug. 27, 1959 10 Sheets-Sheet 1

Nov. 12, 1963 W. S. ASPEY ET AL 3,110,791

CIRCUIT INTERRUPTER WITH PRESSURE-GENERATING AND INTERRUPTING CONTACTS IN INSULATING INTERRUPTING TUBE

Filed Aug. 27, 1959 10 Sheets-Sheet 2

Nov. 12, 1963 W. S. ASPEY ET AL 3,110,791

CIRCUIT INTERRUPTER WITH PRESSURE-GENERATING AND INTERRUPTING CONTACTS IN INSULATING INTERRUPTING TUBE

Filed Aug. 27, 1959 10 Sheets-Sheet 4

Nov. 12, 1963 W. S. ASPEY ETAL 3,110,791

CIRCUIT INTERRUPTER WITH PRESSURE-GENERATING AND INTERRUPTING CONTACTS IN INSULATING INTERRUPTING TUBE

Filed Aug. 27, 1959 10 Sheets-Sheet 7

Nov. 12, 1963 W. S. ASPEY ET AL 3,110,791

CIRCUIT INTERRUPTER WITH PRESSURE-GENERATING AND INTERRUPTING CONTACTS IN INSULATING INTERRUPTING TUBE

Filed Aug. 27, 1959 10 Sheets-Sheet 8

Nov. 12, 1963 W. S. ASPEY ET AL 3,110,791

CIRCUIT INTERRUPTER WITH PRESSURE-GENERATING AND INTERRUPTING CONTACTS IN INSULATING INTERRUPTING TUBE

Filed Aug. 27, 1959 10 Sheets-Sheet 9

Nov. 12, 1963 W. S. ASPEY ET AL 3,110,791

CIRCUIT INTERRUPTER WITH PRESSURE-GENERATING AND INTERRUPTING CONTACTS IN INSULATING INTERRUPTING TUBE

Filed Aug. 27, 1959

10 Sheets-Sheet 10

United States Patent Office 3,110,791

Patented Nov. 12, 1963

3,110,791

CIRCUIT INTERRUPTER WITH PRESSURE-GENERATING AND INTERRUPTING CONTACTS IN INSULATING INTERRUPTING TUBE

Wayne S. Aspey, Monroeville, Pa., and Benjamin P. Baker, deceased, late of Monroeville, Pa., by The Mellon National Bank and Trust Co., executor, assignors to Westinghouse Electric Corporation, East Pittsburgh, Pa., a corporation of Pennsylvania Filed Aug. 27, 1959, Ser. No. 836,405

9 Claims. (Cl. 200—145)

This invention relates to circuit interrupter in general, and more particularly to improved arc-extinguishing structures and contact-operating mechanisms therefor. Certain features of the instant invention are set forth and claimed in United States divisional application filed November 5, 1962, Serial No. 235,573, and assigned to the assignee of the present application.

In United States patent application, Serial No. 683,760, filed September 13, 1957, by Benjamin P. Baker and Winthrop M. Leeds, and assigned to the assignee of the instant application, there are disclosed and claimed improved arc-extinguishing structures, particularly adapted for the utilization of liquefied gases. It is a general object of the present invention to improve upon the arc-extinguishing structures set forth in the aforesaid patent application, particularly adapting them for higher-voltage and higher-current applications.

Another object of the present invention is to provide an improved circuit interrupter, particularly adapted for the employment of liquified gas, in which the enclosed volume for the liquefied gas is a minimum, yet ensuring adequate spacing distances between parts of opposite potential to prevent breakdown.

Another object of the present invention is to provide improved arc-extinguishing structures particularly adapted for series connection, each of said arc-extinguishing structures being of the unit, or elemental type, and of improved construction.

Still a further object of the present invention is to provide an improved circuit-interrupting structure, involving a multiplicity of serially related contact gaps and employing an improved, simple and highly effective contact-operating arrangement.

Another object of the present invention is to provide an improved circuit-interrupting structure in which inspection and maintenance may readily be achieved.

Still a further object of the present invention is to provide an improved circuit-interrupting structure in which a radial magnetic field is utilized, in a simplified manner, to provide a rotation of the arc column between the separable contacts, to result in more efficient contact of the arc with the arc-extinguishing medium.

Another object of the present invention is to provide an improved circuit-interrupting structure involving a pair of serially related pressure-generating arcs, in series with a pair of serially related interrupting arcs.

Still a further object of the present invention is to provide an improved circuit-interrupting structure of the type set forth in the immediately preceding paragraph, in which means are provided to shorten the length of the pressure-generating arc during high-current interruption.

Another object of the present invention is to provide an improved circuit-interrupting structure involving a pair of terminal bushings extending into a metallic enclosure, in which the capacitance employed in conjunction with the terminal bushings is utilized for dividing the voltage between the series contact arrangements in the open-circuit position of the interrupter.

Another object of the present invention is to provide improved contact-operating arrangements for circuit-interrupting devices.

Further objects and advantagecs will readily become apparent upon reading the following specification, taken in conjunction with the drawings, in which.

Figure 4A:
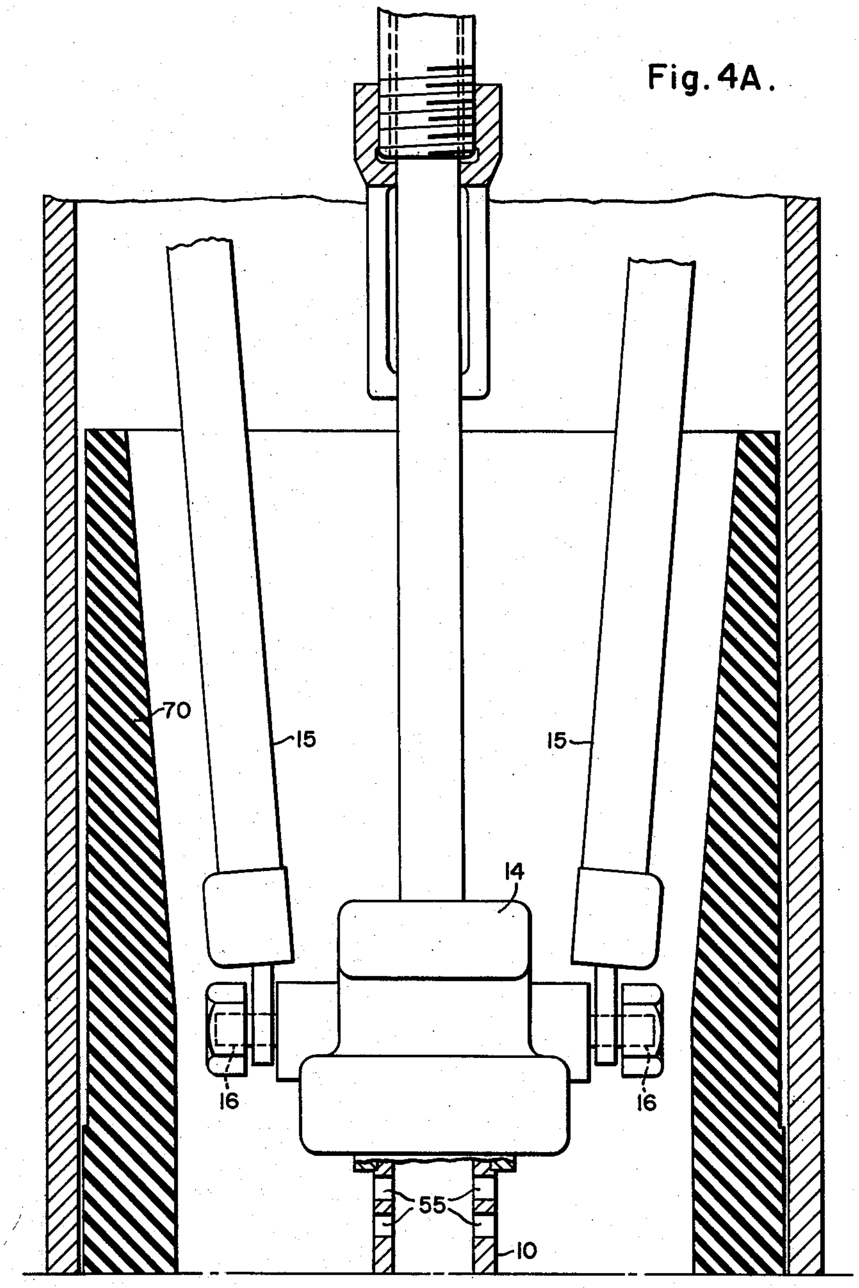
Figure 4B:
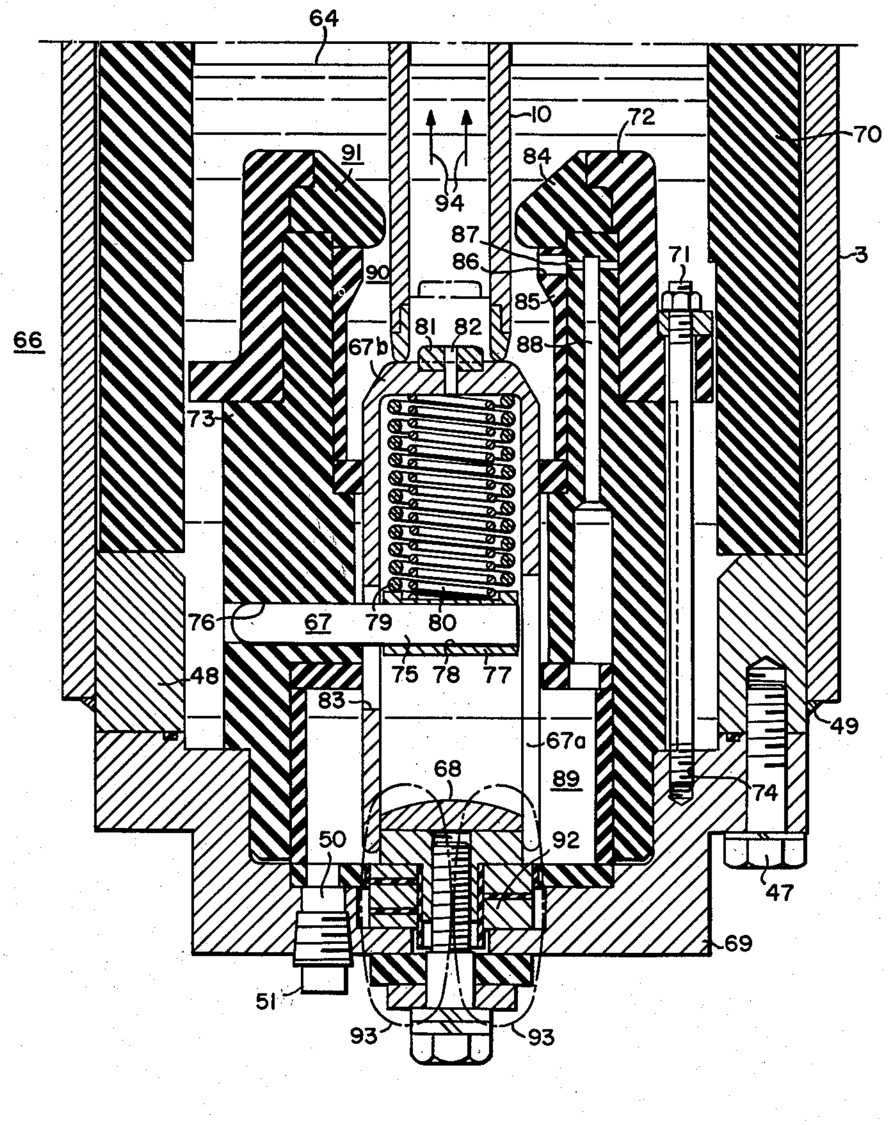
Figure 5:
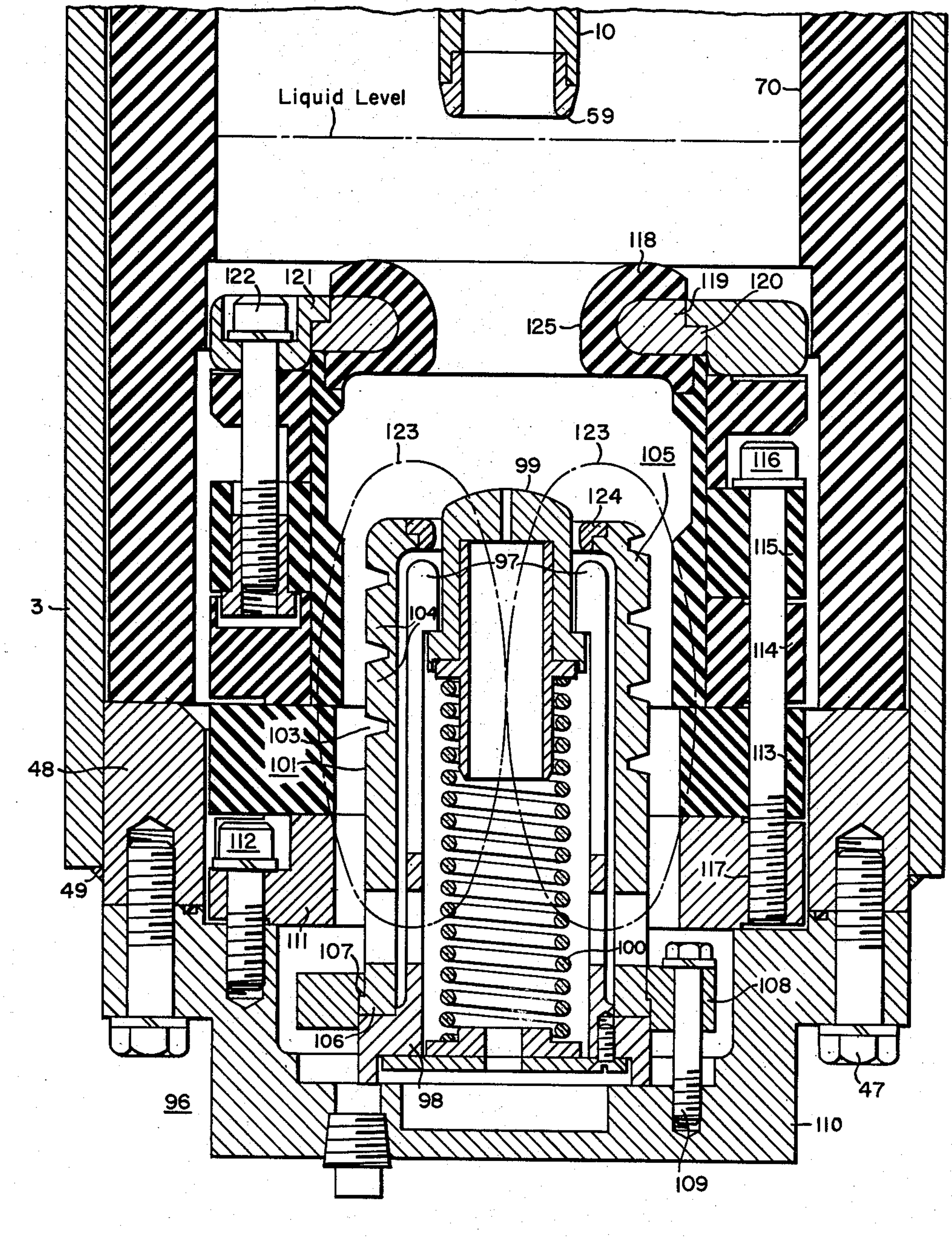
Figure 6:
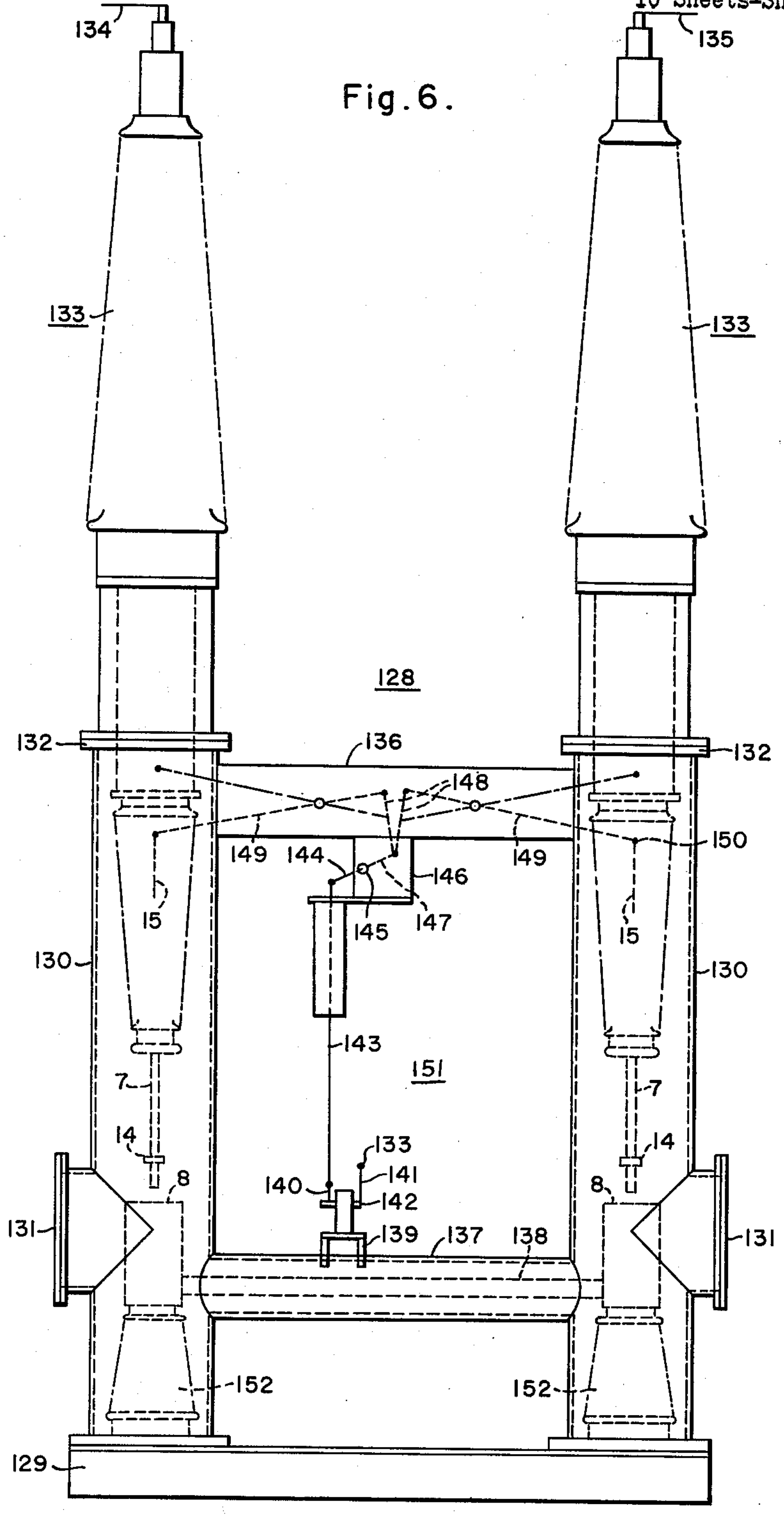
Figure 8:
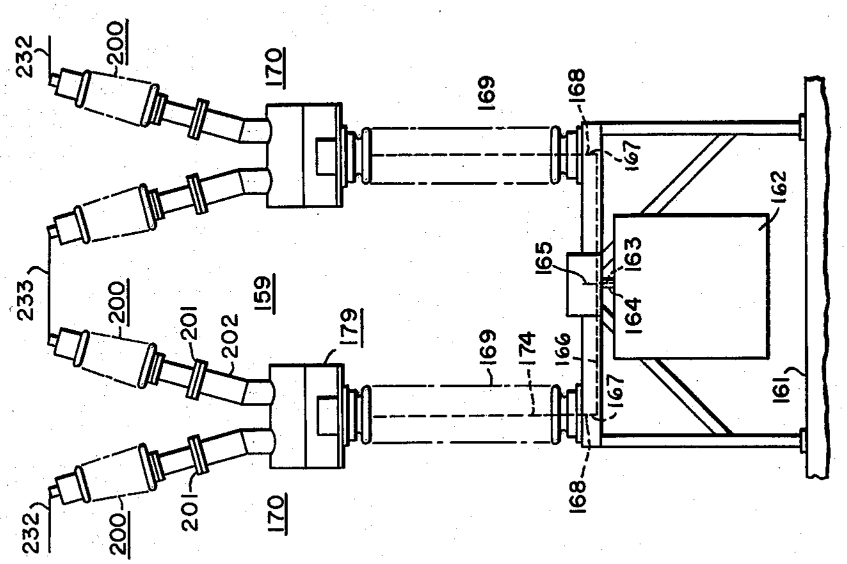
Figure 7:
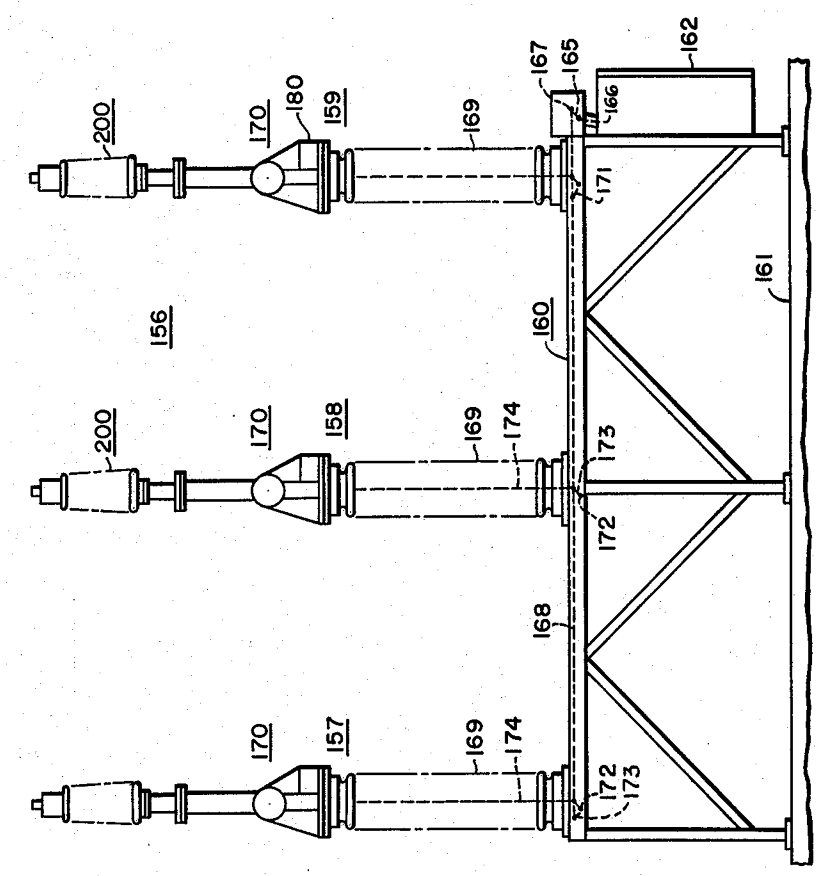
Figure 9:
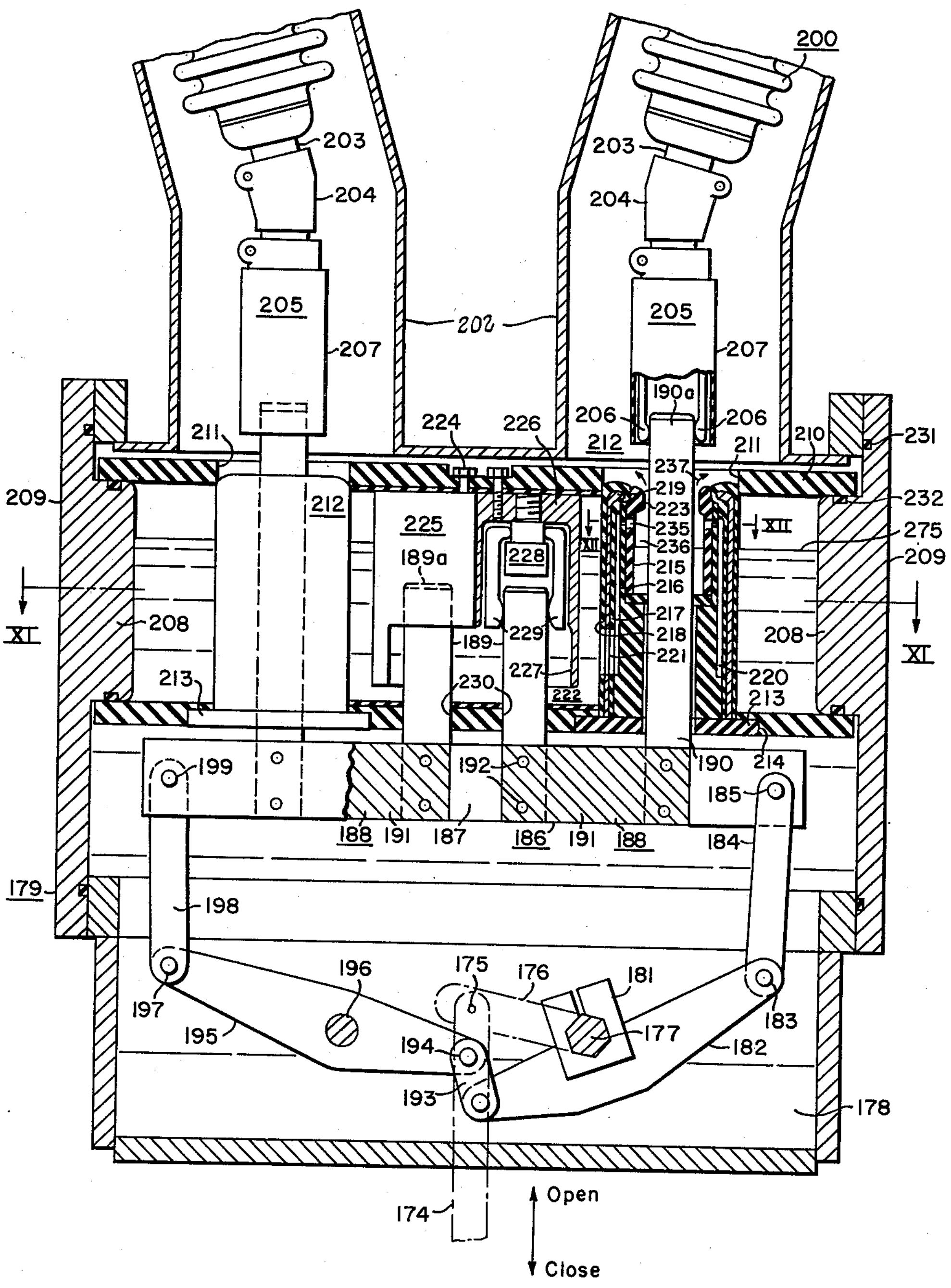
Figure 10:
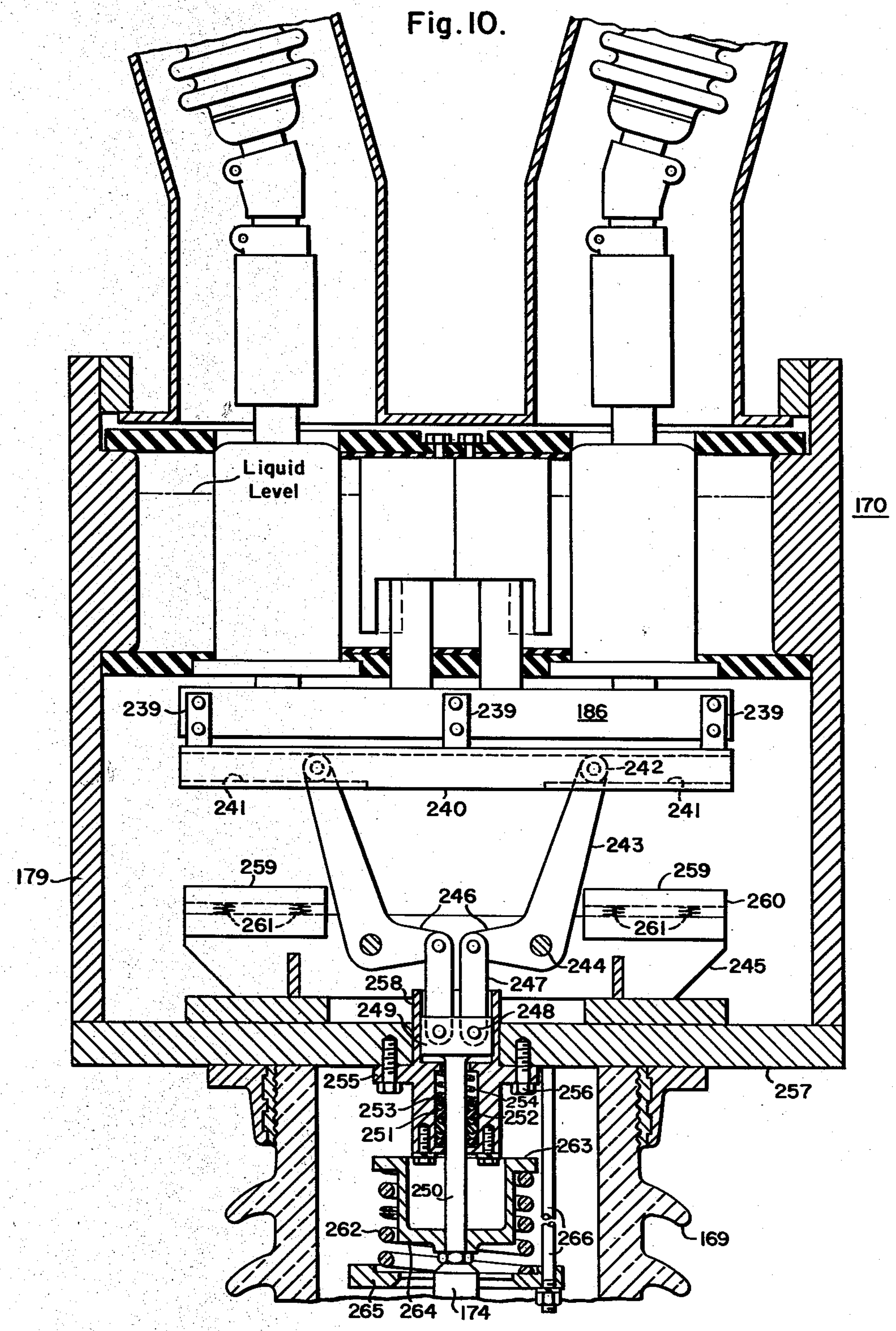
Figure 11:
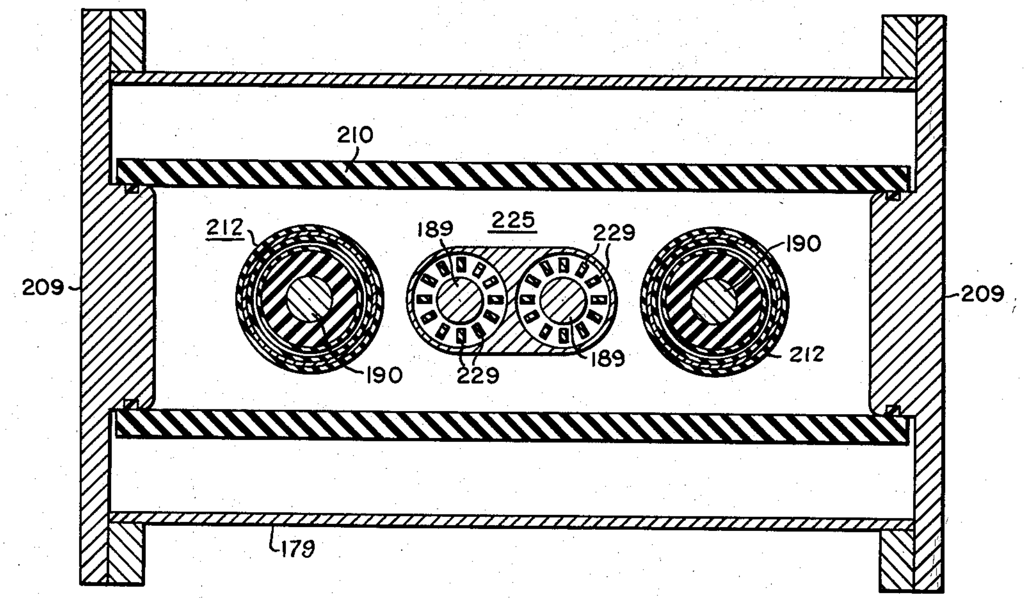
Figure 12:
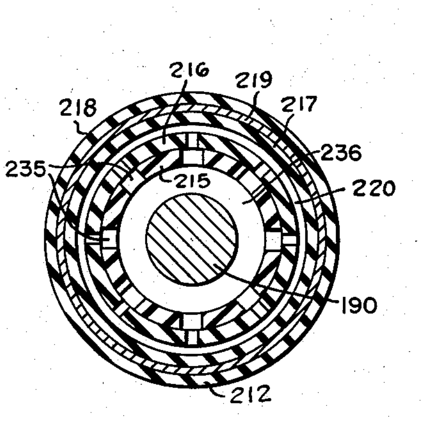
Figure 13:
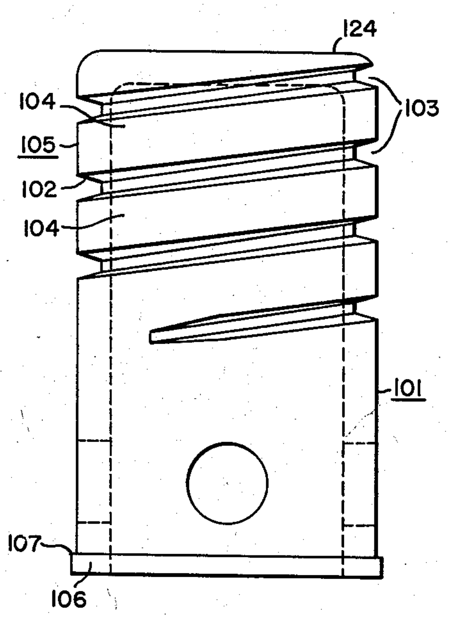

FIGS. 4A and 4B collectively illustrate a vertical sectional view taken through a modified type of circuit-interrupting structure employing a two-break device, with the contact structure being illustrated in the closed-circuit position;

FIG. 5 illustrates a fragmentary, vertical sectional view taken through a further modified type of circuit-interrupting structure, the contact structure being illustrated in the open-circuit position;

FIG. 6 illustrates a side elevational view through a modified type of circuit-interrupting assemblage, illustrating how a pair of serially related arc-extinguishing units may be enclosed, and simultaneously operated, the contact structure being illustrated in the open-circuit position;

FIG. 7 illustrates a front elevational view of still a further modified type of circuit-interrupting assemblage, involving three pole units for a three-phase transmission circuit;

FIG. 8 is an end elevational view of the circuit-interrupting assemblage shown in FIG. 7;

FIG. 9 is an enlarged, vertical sectional view taken through one of the elemental arc-extinguishing units of FIGS. 7 and 8, the contact structure being shown in the closed-circuit position;

FIG. 10 illustrates a modified type of operating arrangement for the contact structure employed in the arc-extinguishing unit of FIG. 9, the contact structure being illustrated in the closed-circuit position;

FIG. 11 is a plan view, in section, taken along the line XI—XI of the arc-extinguishing unit of FIG. 9;

FIG. 12 is a detailed plan view, in section, taken along the line XII—XII of FIG. 9; and, FIG. 13 is a detailed view of the helically-grooved, cylindrical arcing contact of the arc-extinguishing unit of FIG. 5, showing the formed coil convolutions.

Figures 1, 2, 2A:
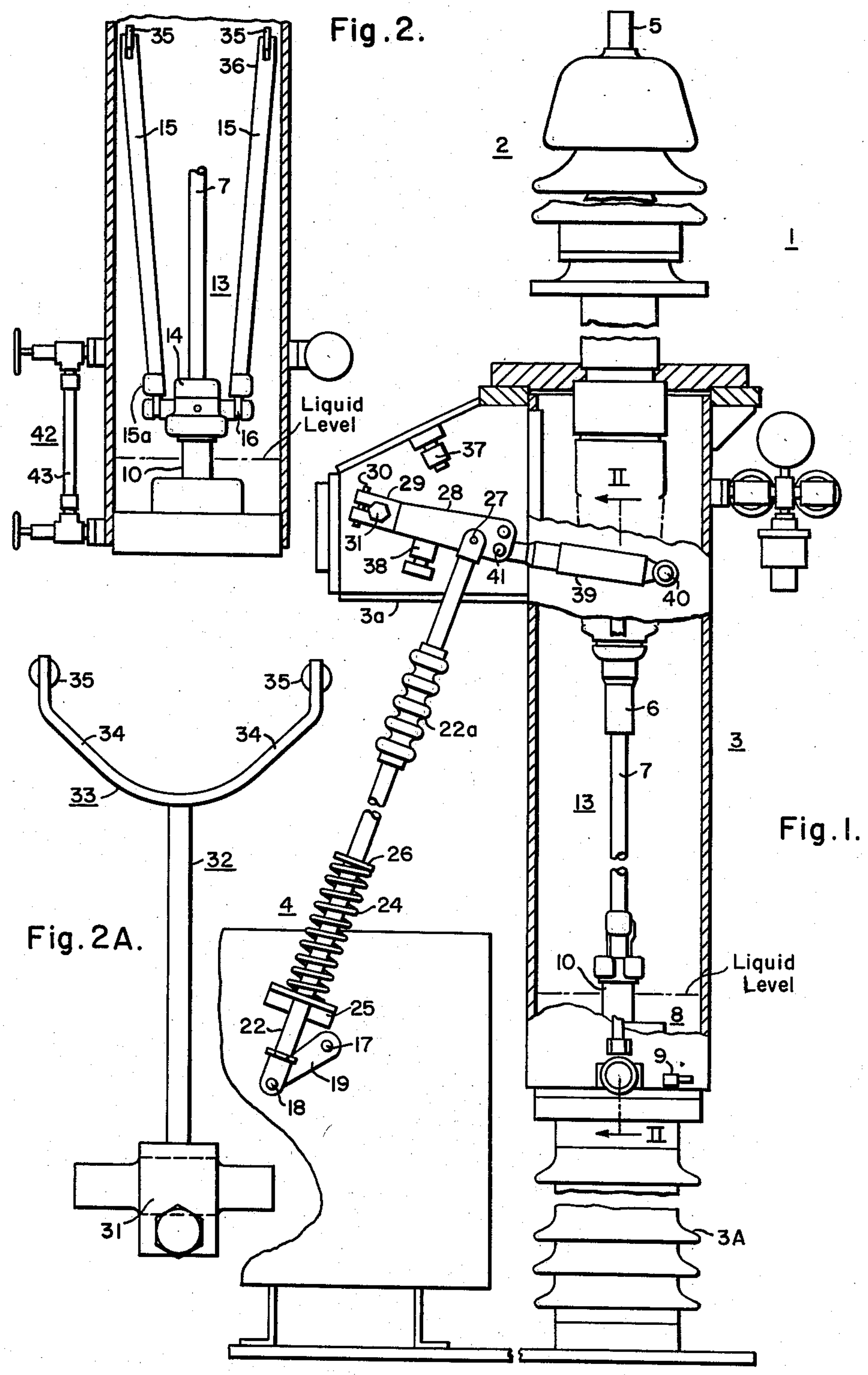
FIGURE 1 is a side elevational view, partially in vertical section, of a circuit-interrupting device embodying the principles of our invention, with the contact structure being shown in the closed-circuit positions.
FIG. 2 is a fragmentary, vertical sectional view, taken substantially along the line II—II of FIG. 1, looking in the direction of the arrows, again the contact structure being shown in the closed-circuit position.
FIG. 2A is a fragmentary plan view of the bifurcated operating lever employed for effecting reciprocating motion of the operating-rod assembly.

Referring to the drawings, and more particularly to FIGS. 1 and 2 thereof, the reference numeral 1 generally designates a circuit-interrupting assemblage including, generally, a terminal bushing 2, a live tank structure at high potential 3, an insulating support 3A, and an operating-mechanism compartment 4.

Generally, the circuit through the interrupting assemblage 1 includes the upper line-terminal connection 5, constituting the upper outer extremity of the terminal stud extending axially through the terminal bushing 2, a slotted, stationary, finger assembly 6, a conducting guide rod 7 (which makes sliding contact with the fingers 6), through an arc-extinguishing unit, generally designated by the reference numeral 8, to a lower line-terminal connection 9.

Figure 3:
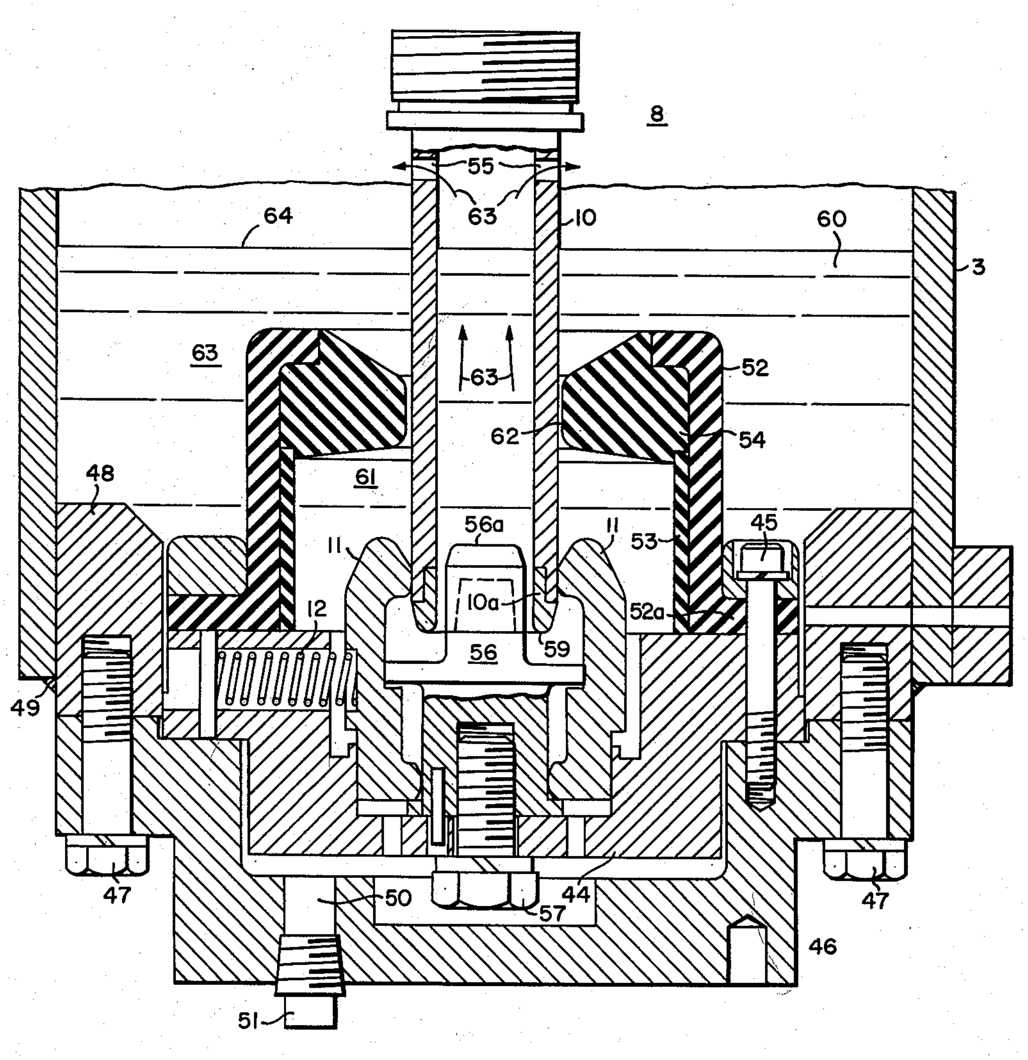
FIG. 3 is a considerably enlarged, fragmentary, vertical sectional view showing one type of interrupting construction, which may be employed within the tank structure of FIG. 1, with the contact structure being illustrated in the closed-circuit position.

With reference to FIG. 3, which shows more clearly the arc-extinguishing unit 8, it will be noted that a vented, tubular contact 10 reciprocally moves in a vertical direction, making separable engagement with a plurality of relatively stationary finger contacts 11, the latter being biased radially inwardly by a plurality of compression springs 12. In the particular arc-extinguishing unit shown in FIG. 3, by way of example, there are eight finger contacts 11 and a corresponding number of contact-biasing springs 12.

With reference to FIG. 1, it will be noted that the reciprocally movable, tubular, venting contact 10 constitutes the lower extremity of the movable contact assemblage 13, comprising the movable contact 10, a cross-head or yoke structure 14, and a pair of upwardly extending insulating operating rods 15. As shown more clearly in FIG. 2, the lower ends of the insulating operating rods 15 have secured thereto metallic rod ends 15*a*, which are pivotally connected, as at 16, to the cross-head structure 14. Thus, upward movement of the insulating operating rods 15 effects, through the cross-head 14, upward corresponding movement of the movable contact 10, separating the latter from the relatively stationary contact fingers 11 to effect opening of the connected circuit.

With further reference to FIG. 2, it will be noted that the cross-head structure 14 is guided, in its vertical reciprocable motion, by the conducting guide rod 7, which makes contacting engagement with the fingers 6, and thereby conducts the current through the terminal bushing 2.

Any suitable mechanism may be employed within the mechanism compartment 4 to effect rotation of an operating shaft 17, which extends externally of the mechanism compartment, or cell 4. Pivotally connected, by a pin 18, to the free end of an operating crank 19, keyed to the operating shaft 17, is an operating rod 22.

The lower end of the operating rod 22 extends within compression accelerating spring 24. The lower end of the compression accelerating spring 24 seats upon a fixed spring base 25, which is secured to the mechanism housing 4. Carried by the operating rod 22 is a washer 26, which provides the upper seat for the accelerating spring 24. As a result, downward closing movement of the operating rod 22 will effect compression of the accelerating spring 24.

The upper end of the operating rod 22 has an insulating portion 22*a* which is pivotally connected, as at 27, to an operating crank-arm 28, having a bifurcated end portion 29 clamped, by a bolt 30, to an operating shaft 31, which extends through the side wall of a laterally extending offset portion 3*a* of the tank structure 3 to effect opening and closing movement of the movable contact assembly 13 disposed therewithin.

With reference to FIG. 2A, it will be noted that this transmission of motion is effected by a crankarm 32, clamped to the operating shaft 31, and having a bifurcated portion 33 including a pair of arms 34. The arms 34 are pivotally connected, as at 35, to upper bifurcated portions 36 (FIG. 2) constituting the upper extremities of the insulating operating rods 15.

To limit the rotation of the operating crankarm 28, bumper stops 37 and 38 are provided attached to the side mechanism compartment 3*a*. Also a shock absorber 39 is pivotally mounted at one end 40 to a lug, not shown, welded to a side of the tank 3. As shown in FIG. 1, the left-hand end of the shock absorber 39 is pivotally connected to the free end of the operating crank 28 by a pivot pin 41.

A liquid-gauge structure 42 (FIG. 2), including a glass tube 43, is provided so that the level of the liquid within the tank structure 3 may be measured.

From the foregoing description, it will be apparent that counter-clockwise rotation of the operating shaft 17, as effected by any suitable mechanism disposed interiorly within the operating cell 4, will, through the linkage, effect compression of the accelerating spring 24, and corresponding clockwise rotation of the crank-arm 28. The clockwise rotation of the crank-arm 28 will effect corresponding clockwise rotation of the internally disposed operating crank 32, effecting downward closing motion of the movable contact assembly 13 including the movable contact 10.

To effect opening of the circuit interrupter, the mechanism, disposed interiorly within the operating cell 4 is tripped, or unlatched, thereby permitting the accelerating spring 24 to force the operating crank 28 in a counter-clockwise direction, as viewed in FIG. 1, effecting corresponding counter-clockwise rotation of the interiorly disposed operating crank 32, and moving the movable contact assembly 13 upwardly effecting separation between the movable contact 10 and the stationary contacts 11.

Referring to FIG. 3, it will be observed that the plurality of relatively stationary finger contacts 11 are disposed within a support ring 44, which is bolted, by bolts 45, to a contact or interrupter support 46. The contact support 46, in turn, is bolted, by bolts 47, to a mounting flange ring 48, which is welded, as at 49, to the lower extremity of the tank 3. An opening 50 is provided through the lower contact support 46. This opening 50 is normally closed by a plug 51.

Fixedly secured by the bolts 45 to the interrupter support 46 is an orifice support 52 composed of insulating material, and having a lower mounting flange portion 52*a*. Lining the orifice support 52 is a sleeve 53 and an orifice ring 54, both composed of polytetrafluoroethylene, as more fully explained in United States Patent 2,757,261.

It will be noted that vents are provided adjacent the upper end of the tubular movable contact 10. A relatively stationary plug-type arcing horn 56 is provided, being secured to the support ring 44 by a mounting bolt 57.

The manner of operation of the interrupting structure 8 will now be described. During the opening operation, the movable tubular contact 10 is withdrawn upwardly by the movable contact assembly 13 in the manner previously described. This causes separation between the lower contacting portion 10*a* of movable contact 10 and the fingers 11. The established arc is drawn between an arc-resisting ring 59, secured by a press fit to the lower end of the movable contact 10 and the upper end 56*a* of the arcing horn 56. The liquefied gas 60, disposed within the tank 3, and filling the region 61 within the orifice support 52 is gasified, and the pressure within the region 61 is considerably increased. Upon the upward withdrawing of the movable tubular venting contact 10 out of the orifice restriction 62 of the orifice ring 54, the generated gas and liquid particles will be directed into the arc stream, not shown, and effect the extinction thereof. Because of the provision of the venting apertures 55 in the tubular movable contact 10, an exhausting of gas will take place upwardly through the movable tubular contact 10 prior to the withdrawal thereof through the orifice restriction 62, as indicated by the arrows 63.

Using liquid $SF_6$, the interrupter 8 gave satisfactory results at 66, 44, and 22 kv. to currents of 2000 amps. Later tests showed good results from 25,000 to 50,000 amperes.

The liquid-gauge structure 42 (FIG. 2) indicates the proper level of the liquefied gas, which is preferably above the orifice structure 63 near the level 64, for example.

FIGS. 4A and 4B collectively illustrate a modification of the invention, in which a modified type of interrupting structure, generally designated by the reference numeral 66, is substituted for the interrupting structure 8 of FIG. 3. As before, a yoke or cross-head structure 14 is provided, being pivotally connected to the operating rods 15 by pivot pins 16. The movable tubular venting contact 10, with its venting apertures 55 at the upper end thereof, is similar in structure, and operation to the movable contact 10 of FIG. 3. With reference to FIG. 4B, it will be noted that the movable contact 10 makes abutting engagement with an intermediate contact, generally designated by the reference numeral 67. The lower end 67*a* of the intermediate contact 67 makes contacting engagement with a lower, relatively stationary plug-type pressure-generating contact 68. Bolts 47 fixedly secure an interrupter support 69 to a mounting flange ring 48, the latter being secured, as by welding 49, to the lower end of the metallic tank 3. A cylindrical insulating tank liner 70 is disposed within the tank 3 along the inner wall thereof, and has the function of protecting the tank 3 from the effects of arcing during the opening operation of the intertupter 66.

Additional stud bolts 71 fixedly secure an orifice support 72 and an insulating mounting support 73 into position. The lower ends of the mounting stud 71 threadedly secure into tapped openings 74 provided in the interrupter support 69.

As shown in FIG. 4B, a stationary support pin 75, extending laterally within an opening 76, provided in the mounting support 73, serves to limit the opening movement of the intermediate contact 67. A spring-seat plate 77 has an opening 78 therein to accommodate the stop pin 75. The spring-seat plate 77 serves as a lower spring seat for a battery of compression springs 79, 80, which extend upwardly within the interior of the tubular intermediate contact 67, and serve to bias the same in an upward opening direction. An arc-resisting tip 81, having an aperture 82 therein, is fixedly secured, by any suitable means, to the upper end 67*b* of the intermediate contact 67. A slot 83 in the side wall of the tubular intermediate contact 67 accommodates the stop pin 75, and cooperates therewith to limit the opening travel of the intermediate contact 67.

The orifice support 72 fixedly clamps into position an orifice ring 84 and an orifice liner 85, which, as before, may be composed of polytetrafluoroethylene. Openings 86, provided at the upper end of the orifice liner 85, register with openings 87 and axially extending bores 88, which extend upwardly within the mounting support 73. These several registered openings provide a means of communicating the pressure from the region 89, constituting a pressure-generating chamber, with the region 90, constituting an interrupting region, and disposed within the upper orifice structure, generally designated by the reference numeral 91. In addition, a radial magnetic field coil 92 is provided, comprising a few series turns of formed copper bar, which set up a radial magnetic field, as indicated by the arrows 93, to effect a rotation of the pressure-generating arc, not shown.

During the opening operation, the cross-head structure 14 effects upward opening movement of the movable tubular venting contact 10. The compression springs 79, 80 effect a following, upward travel of the intermediate contact 67. This causes a separation between the lower end 67*a* of the intermediate contact 67 and the stationary pressure-generating contact 68. A pressure-generating arc, not shown, is drawn, which is whirled, or rotated by the magnetic field 93, set up by the series magnetic coil 92. When the lower end of the slot 83, within intermediate contact 67, abuts stop pin 75, the upward opening movement of the intermediate contact 67 is halted. Subsequently, the upper movable tubular venting contact 10 separates from the upper end 67*b* of the intermediate contact 67, to establish an interrupting arc, not shown, which is extinguished by a plurality of radially directed fluid jets traveling upwardly from the pressure-generating region 89 through the axial bores 88, within mounting support 73, and radially inwardly through the plurality of openings 86 in orifice liner 85. As a result of the fluid forced upwardly from the pressure-generating chamber 89 by the establishment of pressure resulting from the pressure-generating arc, the interrupting arc is quickly extinguished. In addition, fluid is exhausted upwardly within the interior of the movable tubular contact 10, as indicated by the arrows 94. The effect is very rapid arc extinction.

During the closing operation, the cross-head structure 14 is moved downwardly by the operating rods 15. This effects downward closing travel of the movable tubular contact 10, which strikes the intermediate contact 67 and forces the latter downwardly into engagement with the stationary contact 68, compressing the springs 79, 80. The circuit is then closed. This interrupter 66 interrupted currents over 50,000 amps. at 66, 44, and 22 kv.

In the modified interrupter 96 of FIG. 5, it will be noted that the movable tubular venting contact 10 makes engagement with a plurality of contact fingers 97. The contact fingers 97 are formed by suitably machining, and slotting a tubular contact support 98. A plug contact 99, biased in an opening direction by a compression spring 100, cooperates with the lower end 59 of the tubular contact 10 in the closed-circuit position, not shown.

Surrounding the relatively stationary contact fingers 97 is a tubular arcing horn 101 (FIG. 13) having an outer helically grooved surface 102. The helical grooves 103 compel the current to flow within the helically extending thickened portions 104, constituting turns of a radial magnetic-field coil, generally designated by the reference numeral 105. This radial magnetic field coil 105 constitutes the upper part of a tubular contact support 106, having a radially outwardly extending mounting flange portion 107, which is maintained in position by a mounting ring 108, secured by a plurality of mounting bolts 109 to an interrupter support plate 110. As before, the interrupter support plate 110 is secured by bolts 47 to a mounting flange ring 48 welded, as at 49, to the lower end of the tank 3. A mounting ring 111 is secured by bolts 112 to the interrupter support plate 110. Immediately above the support ring 111 are three insulating rings 113–115, which are secured by mounting bolts 116, the latter threaded into tapped openings 117 provided in the support ring 111.

An insulating orifice ring 118 is secured into place by a split mounting ring 119, the latter having a flanged portion 120 cooperating with a mounting ring 121. The mounting ring 121 is secured by bolts 122 fixedly into position, as shown in FIG. 5.

During the opening operation, the movable tubular vented contact 10 moves upwardly, as described hereinbefore, causing the separation of the lower ring-shaped, arc-resisting, tip portion 59 from the plug contact 99 and fingers 97. The compression spring 100 effects upward following motion of the plug contact 99 with the movable tubular contact 10. An arc, not shown, is drawn, and causes the radial magnetic field-coil structure 105 to carry the series current through the thickened portions 104, or turns thereof, to effect the setting up of a radial magnetic field. This radial magnetic field, as indicated by the arrows 123, effects the rotation of the established arc around the upper annular ring portion 124 of the field-coil structure 105. Meanwhile, the establishment of pressure, generated by the heat of the arc drawn through the orifice restriction 125, effects extinction of the arc established therethrough.

During the closing operation, the movable contact 10 moves downwardly, and passes through the restriction 125 engaging the plug contact 99 and the finger contacts 97. The circuit is then closed through the interrupter.

The interrupting assemblage 128 in FIG. 6 shows how a pair of arc-extingunishing units 8, 66, or 96 may be simultaneously operated. As shown in FIG. 6, a support base 129 supports upwardly a cylindrical, grounded, metallic casing 130, having inspection covers 131. Extending downwardly interiorly through the upper ends 132 of the metallic casings 130 is a pair of terminal bushings 133. Line connections 134, 135 may be provided.

A pair of hollow tubes 136, 137 laterally connect the metallic casings 130. The lower metallic tube 137 not only has interiorly extending therewithin the bar connector 138, connecting the interrupting units 8, but also provides a support 139 for a pair of crank-arms 140, 141. The crank-arms 140, 141 are keyed to an operating shaft 142. Rotation of the crank-arm 140 effects reciprocal vertical movement of a connecting link 143, the upper end of which is pivotally connected to a crank-arm 144, which effects the rotation of an operating shaft 145, extending interiorly within a downwardly depending housing structure 146. Interiorly of the housing structure 146 is another crank-arm 147, which drives, at its free end, a pair of links 148, which are pivotally connected to crank-arms 149. The outer free ends of the crank-arms 149 are pivotally connected, as at 150, to the operating rods 15. The operating rods 15 are connected to the cross-head structure 14, as more clearly shown in FIG. 2 of the drawings.

The circuit interrupting assemblage 128 illustrated in FIG. 6 shows how a pair of arc-extingiushing units 8 may be simultaneously operated, by a contact-operating mechanism 151, within a casing structure 130 of minmum fluid content. The terminal bushings 133 may be of substantially standard construction, having the lower ends of the terminal studs extending therethrough hollow to telescopically accommodate the upward opening movement of the movable contact guides 7. The entire structure is high speed in operation, and of light-weight construction. In addition, since the casings 130, 136, 137 are grounded, adequate protection for operating personnel is afforded. The arc-extinguishing units 8 may be fixedly secured into place by insulating mounting pedestals 152, as shown. A horizontally extending operating rod 133, pivotally connected to the crank-arm 141, effects rotation of the operating shaft 142. The operating shaft 142 effects through the crank-arm 140 and link 143, rotation of the crank-arm 144. Rotation of crank-arm 144 effects rotation of the operating shaft 145, and transmits the operating energy interiorly of the housing structure 146. The crank-arm 147, keyed to the operating shaft 145, effects simultaneous motion of the links 148, which effect pivotal rotation of the crank-arms 149. The crank-arms 149 effect opening and closing motion of the operating rods 15 and cross-head structure 14, in the manner as described hereinbefore.

FIGS. 7 and 8 illustrate a modification of the invention adapted for 196 kv. breaker rating. As shown in FIG. 7, a three-phase circuit interrupting assemblage, generally designated by the reference numeral 156, including three interrupting assemblages 157–159, is mounted upon an angle-iron framework 160. The framework 160, at ground potential, is supported upon a concrete slab 161. Situated at the right-hand end of the framework 160, as viewed in FIG. 7, is an operating-mechanism housing 162. Any suitable operating mechanism may be employed. As viewed in FIG. 8, it will be noted that a reciprocally-operable operating rod 163 extends upwardly through a housing tube 164, and connects to an end of a bell crank lever 165. The crank-arm 165 is keyed to an operating shaft 166 extending in opposite directions, as viewed in FIG. 8.

The operating shaft 166 is keyed to a pair of crank-arms 167, which effect reciprocal, horizontal movement of a pair of operating rods 168, which extend below the insulating columns supporting the elemental circuit-interrupting units, or "building-block" units 170.

The horizontal, reciprocally movable, operating rods 168 are pivotally connected to bell-cranks 171, which are pivoted on shafts 172. The bell-cranks 171 have arms 173 which have pivotally connected thereto, at their free ends, operating rods 174, which extend vertically upwardly interiorly within the procelain supporting columns 169.

As viewed in FIG. 9, the vertically extending operating rods 174 are pivotally connected, as at 175, to additional crank-arms 176, which are keyed to operating shafts 177, the latter extending through the side wall 178 of a pressure-resistant, metallic, interrupting housing, generally designated by the reference numeral 179. If desired, a laterally-extending, bracket-support housing 180 may be provided for each casing structure 179 to provide a bearing support for the internal end of the operating shaft 177.

With reference to FIG. 9, it will be noted that the operating shaft 177 has clamped thereto, interiorly of the pressure-resistant, interrupting housing 179, a clamp 181, to which is welded an operating crank 182. At one end of the crank 182 is pivotally connected, by a pivot pin 183, a link 184, the upper end of which is pivotally connected, as at 185, to a vertically movable operating bar 186, composed of insulating material. Preferably the insulating operating bar, generally designated by the reference numeral 186, includes a pair of insulating strips 187, between which is interposed a pair of generally U-shaped contact structures 188.

Each contact structure 188 includes a rod-shaped, pressure-generating contact 189, and a rod-shaped, interrupting contact 190, electrically interconnected by a connector strip 191. Suitable rivets 192 may be employed to fixedly secure the contacts 189, 190 and the connecting strips 191 between the insulating operating strips 187.

Pivotally connected to the left-hand end of the operating crank 182, as viewed in FIG. 9, is a link 193, the upper end of which is pivotally connected, as at 194, to a pivotally-mounted crank-arm 195. The crank-arm 195 is pivotally mounted to a shaft 196, the ends of which may be suitably journaled within the walls of the interrupting casing 179.

Pivotally connected, as at 197, to the lefthand end of the operating crank-arm 195, as viewed in FIG. 9, is a link 198, the upper end of which is pivotally connected, by a pivot pin 199, to the insulating strips 187.

As more clearly shown in FIG. 8, a pair of low-voltage terminal bushings 200 are clamped to flange portions 201, disposed at the upper ends of extensions 202, extending upwardly from each metallic casing structure 179. With reference to FIG. 9, it will be noted that the lower ends of the terminal studs 203, of the terminal bushings 200, have clamped thereto adapter feet 204, which support relatively stationary contact structures 205. Generally, the relatively stationary contact structures 205 include a plurality of contact fingers 206, biased inwardly, and surrounded by a tubular insulating cylindrical shield member 207.

FIG. 9 shows the contacting engagement between the contact fingers 206 and the upepr ends of the rod-shaped interrupting contacts 190. Disposed interiorly within the casing structure 179, and maintained into proper position by inwardly extending boss portions 208, integrally formed with end covers 209, is an insulating interrupting tube 210. The interrupting tube 210 has a pair of openings 211 provided at the upper end thereof, which serve to stationarily position a pair of interrupting orifice structures, generally designated by the reference numeral 212. The lower ends of the orifice structures 212 have an annular mounting flange plate 213, which is disposed within a recess 214 provided at the lower side of the insulating interrupting tube 210.

As shown in FIG. 9, each orifice structure 212 includes concentrically-positioned, insulating tubes 215–218 and a metallic, pressure-resistant tube 219. An annular, axially-extending, flow passage 220 communicates with openings 221, extending, in registered relation, through the lower ends of the insulating tubes 215—218 to a pressure-generating chamber 222, disposed interiorly within the insulating tube 210.

It will be noted that the interior insulating tube 215 has an upper orifice portion 223, through which the movable rod-shaped interrupting contact 190 traverses.

Secured, as by bolts 224, to the upper side of the tube 210 is a relatively stationary pressure-generating contact structure, generally designated by the reference numeral 225.

The relatively stationary, pressure-generating contact structure 225 includes a downwardly extending, magnetic, contact support 226, having a depending, segmental, magnetic, flange shield portion 227, which is employed to shorten the pressure-generating arc during high-current interruption, as explained more fully hereinafter.

Disposed interiorly within the contact support 226 is a pair of relatively stationary, pressure-generating, contact structures 228, including a plurality of contact fingers 229, preferably biased radially inwardly by suitable means, not shown, and making contacting engagement within the upper ends of the pressure-generating contacts 189.

Additional openings 230, extending centrally through the lower side of the insulating interrupting tube 210, accommodate vertical reciprocal opening and closing movement of the pressure-generating contacts 189.

As shown more clearly in FIG. 8, considering only the right-hand circuit interrupting assemblage or pole unit 159, the electrical circuit extends through the transmission line 232, through the terminal stud 203 of left-hand terminal bushing 200, relatively stationary contact structure 205 (associated with the left-hand arc-extinguishing unit 170), through movable interrupting contact 190, contact strap 191 (FIG. 9), left-hand pressure-generating contact 189, relatively stationary pressure-generating contact structure 225, second pressure-generating contact 228, second movable pressure-generating contact 189, through contact strap portion 188, to the right-hand rod-shaped, interrupting contact 190 (FIG. 9). The circuit then extends through the relatively stationary contact structure 205, and upwardly through the terminal stud 203 of the right-hand terminal bushing 200 (FIG. 9). Viewing FIG. 8, the circuit then extends through the connector 233, and through the right-hand arc-extinguishing assemblage 170 to the line connection 234.

During the opening operation, suitable mechanism, enclosed within mechanism compartment 162, and forming no part of the present invention, is operative to effect upward opening movement of the operating rod 163. This effects, through the crank-arm 165, counter-clockwise rotation of the crank-arms 167 (FIG. 7), and leftward movement of the two operating rods 168. Through the several bellcranks 171, the operating rods 174, extending interiorly upwardly within the insulating columns 169, are moved upwardly, to effect, through the crank-arm 176 and operating shaft 177, clockwise rotation thereof. This effects, through the contact operating arm 182, downward movement of the operating bar 186. The downward movement of the operating bar 186 simultaneously effects downward separating opening motion of the four movable rod-shaped contacts 189, 190. This effects establishment of two pressure-generating arcs, each being drawn between the upper end of one of the movable pressure-generating contacts 189 and the relatively stationary, pressure-generating finger contacts 229. The establishment of the two pressure-generating arcs within the pressure-generating chamber 222 effects raising of the pressure therein by the gasification of some of the liquefied gas. As a result, the pressure within the entire insulating interrupting tube 210 is raised.

At the same time that the two serially related pressure-generating arcs, not shown, are established within the pressure-generating chamber 222, a pair of serially related interrupting arcs, not shown, are drawn between the upper tip portions 190*a* of the movable rod-shaped interrupting contacts 190 and the relatively stationary interrupting fingers 206. It will be noted that the two serially related interrupting arcs are drawn downwardly through the two orifice structures 212 within the orifice restrictions 223.

The establishment of increased pressure within the pressure-generating chamber 222 will force liquefied gas through the openings 221 and upwardly within the axially extending flow passage 220, and inwardly through the openings 235 at the upper end of the insulating tube 215. As a result, the interrupting arc is blasted, radially inwardly, from all sides by the liquefied gas. Since the lower end of the region 236 is closed, the liquefied gas is ejected out of the orifice opening 223 in the direction indicated by the arrows 237. The interrupting arc is, therefore, quickly extinguished.

During the interruption of relatively low and medium-value currents, the two pressure-generating arcs are drawn between the upper tip portions 189*a* of the two rod-shaped, pressure-generating contacts 189 and the relatively stationary, pressure-generating finger contacts 229. This results in a relatively long length of the pressure-generating arc.

During the interruption of relatively high-value arcing currents, the disposition of the magnetic segmental shield 227, disposed adjacent to the path of the drawing of the pressure-generating arc results in the upper end of the pressure-generating arc transferring to the laterally-disposed, magnetic shield 227 to result in the shortening thereof, and consequently the diminution of the resulting increase of pressure. From the foregoing description, it will be apparent that the use of the magnetic arcing shields 227 results in a controlling or a regulation of the length of the pressure-generating arc during high-current interruption.

It will be noted that the pressure-generating arcs are totally confined within the insulating interrupting tube 210, and are arranged so that the liquid, such as a liquefied gas, is forced through the axial flow passage 220 and into the interrupting arcs, which are drawn through the orifice restrictions 223.

The jetting of the liquefied gas into the interrupting arcs, which are drawn through the orifices 223 preferably formed from polytetrafluoroethylene, quickly effects the extinction of the interrupting arcs.

The volume of the interrupting tube 210 and the space below the liquid level is reduced to a minimum. The liquid level is indicated at 275 in FIG. 9. Also the interrupting arcs are drawn from the outside of the interrupting tube 210 through the orifices 223. This is desirable to avoid the large forces tending to prevent the breaker from closing, if an attempt is made to close on a large current with appreciable pre-arcing in a confined volume filled with an incompressible fluid. The provision of the magnetic arcing horns 227, as a part of the relatively stationary pressure-generating contact structure, results in a long pressure-generating arc being drawn for low and medium-values of current, and relatively shortened arcs during the interruption of higher currents. This follows since at high values of current, the magnetic forces will direct the pressure-generating arcs to the horns 227 and thus prevent their lengthening, and the consequent production of excessive pressure.

An important advantage of the construction illustrated in FIG. 8 is that the capacitance provided in each terminal bushing 200 results in a substantial equal division of voltage between the contact structures in the open-circuit position of the interrupter. Thus, the dividing of the voltage between the contact structures, so that each contact structure will interrupt its fair share of the total voltage is automatically provided for by the utilization of the terminal bushings 200, and their associated capacitance means, provided between the axially extending terminal studs 203 and the extension 202 of the metallic tank structure 179.

FIG. 10 shows a modified type of contact operating mechanism. It will be noted that the operating bar 186 is secured by supports 239 to a metallic channel member 240, providing a pair of raceways 241 for rollers 242, pivotally mounted at the free ends of bell-crank operating levers 243. The operating levers 243 are pivotally mounted, as at 244, to upwardly extending, side support plate 245.

Pivotally connected to the free ends of the opposing arms 246 of the bell-crank levers 243 are links 247, the lower ends of which are pivotally connected, as at 248, to a cross-head structure 249 reciprocably movable in a vertical direction. The cross-head structure 249 has a lower extension 250, which slides through a seal 251, provided by a plurality of resilient O-rings 252 maintained under pressure by a washer 253 and a compression spring 254. The seal 251 is provided by a flange support member 255, secured by bolts 256 to the lower wall 257 of the casing structure 179.

The seal 251 has an upwardly extending cylindrical portion 258, within which the cross-head member 249 is vertically guided.

Disposed at the upper end of the side support plates 245 is a pair of bumpers 259, provided by an overlying channel member 260 biased upwardly by compression springs 261. Thus, upon the downward retracting movement of the operating bar 186, the channel member 240 will strike the upper surfaces of the channel 260 and be resiliently brought to a cushioned stop.

The vertically extending insulating operating rod 174, disposed within the porcelain column 169, is biased in an upward opening direction by an accelerating compression spring 262, disposed between a flange portion 263 of a supporting cup 264, secured to the operating rod 174, and a lower spring seat 265 secured by studs 266 to the base plate 257 of the arc-extinguishing unit 170.

From the foregoing description, it will be noted that the accelerating compression spring 262 biases the supporting cup 264, and consequently the cross-head structure 249 in an upward opening direction. The bell-crank members 243 are biased in opposite rotating directions, so that the rollers 242 are moved outwardly in the raceways 241, to effect lowering of the channel member 240 and hence a lowering, or opening movement of the movable contact structure.

During the closing operation, the operating rod 174 is forced downwardly to effect thereby compression of the accelerating spring 262, and a downward movement of the cross-head structure 249 within the cylindrical guide 258. This effects downward movement of the two links 247, and rotation of the two bell-cranks 243 toward each other. As a result of this movement, the two rollers 242 move toward each other, and effect raising of the channel member 240 and corresponding raising, or closing movement of the operating bar 186.

From the foregoing description of the invention, it will be apparent that there is provided a number of interrupting structures particularly suitable for the liquefied gases as set forth in the aforesaid Leeds and Baker application. Although the interrupting structures have particular advantage when used with a liquefied gas, it is to be noted that a certain degree of interrupting effectiveness is also available by using the same interrupting structures with a suitable ordinary arc-extinguishing fluid, such as a liquid, for example, circuit-breaker oil.

From the foregoing description of the present invention, it will be apparent that there are disclosed novel types of circuit interrupters utilizing liquefied gas injected into the arcing zone. Although liquefied $SF_6$ has been used as an example of a possible liquefied gas, in describing the structures, it is to be clearly understood that liquefied selenium hexafluoride, or any one or a mixture of two or more of liquefied gases enumerated below may be employed in the substitution of liquid $SF_6$.

The gases which are suitable for use in interrupters of the type considered, have similar properties and characteristics as set out in the following table.

| | Boiling Point, ° C. | Vapor Pressure, #/sq. in. gauge at 20° C. | Dielectric Strength Compared With Air or $N_2$ |
|---|---|---|---|
| $CO_2$ | −78 | 830. | 0.9 |
| $SO_2$ | −10 | 35. | 2.0 |
| $SF_6$ | −63.8 | 300. | 2.2 |
| $SeF_6$ | −34.5 | ------ | 2.9 |
| $SOF_2$ | −30 | 160. | 2.5 |
| $CCl_2F_2$ | −28 | 68. | 2.4 |
| $ClO_3F$ | −47.5 | 139. | 3.0 |
| $C_2F_6$ | −78 | ------ | 1.8 |
| $C_3F_8$ | −37 | ------ | 2.0 |
| $CClF_3$ | −81.5 | 325. | 1.4 |
| $CF_3Br$ | −58 | 195. | 1.25 |

Although the foregoing liquefied gases may be used to advantage, exceptional and unusual performance is obtained with liquid $SF_6$ and liquid $SeF_6$, since the gaseous phase of these two materials are so highly effective in arc interruption and high dielectric insulation.

With the arc-extinguishing assemblages of FIGS. 7 and 8, it is to be noted that the employment of a number of the arc-extinguishing units 170 in series relation will adapt the structure for any voltage and current-interrupting rating.

Although there have been shown and described specific structures, it is to be clearly understood that the same were merely for the purpose of illustration, and that changes and modifications may readily be made therein by those skilled in the art, without departing from the spirit and scope of the invention.

We claim as our invention:

1. The combination in a circuit interrupter of a metallic tank, a pair of terminal bushings extending into said metallic tank and carrying relatively stationary contact structures at their interior ends, a relatively stationary insulating interrupting tube, said relatively stationary contact structures being disposed externally of the interrupting tube, a pair of movable interrupting contact cooperable with the relatively stationary contact structures and movable transversely through said insulating interrupting tube, a pair of relatively stationary pressure-generating contacts mounted to the wall of the interrupting tube, a pair of cooperable movable pressure-generating contacts movable transversely through the opposite side walls of the interrupting tube, an actuating bar disposed externally of the interrupting tube and extending generally parallel thereto, the pair of movable interrupting contacts and the pair of movable pressure-generating contacts being fixedly secured to said actuating bar to be operated thereby, and fluid under pressure generated at the two pressure-generating arcs within the interrupting tube being forced toward the two interrupting arcs to effect the extinction thereof.

2. A fluid-blast circuit interrupter including a tank, a pair of terminal bushings extending into said tank and carrying relatively stationary contacts at their interior ends, a relatively stationary insulating interrupting tube having openings in the side wall thereof disposed within the tank, said relatively stationary contacts being disposed externally of the interrupting tube, a pair of movable contacts movable through diametrically-located side openings in the wall of the interrupting tube and into engagement with the relatively stationary contacts externally of the tube, a pair of movable pressure-generating contacts movable through an additional pair of openings in the side wall of the interrupting tube, an electrically-connected pair of pressure-generating contacts supported to a side wall of the tube and cooperable with the aforesaid pair of pressure-generating contacts to establish a pair of serially related arcs, and the pressure generated during opening within said interrupting tube blasting fluid through the interrupting arcs to effect their extinction.

3. A fluid-blast circuit interrupter including a tank, a pair of terminal bushings extending into said tank and carrying relatively stationary contacts at their interior ends, a relatively stationary insulating interrupting tube having openings in the side wall thereof disposed within the tank, said relatively stationary contacts being disposed externally of the interrupting tube, a pair of movable contacts movable through diametrically-located side openings in the wall of the interrupting tube and into engagement with the relatively stationary contacts, a pair of movable pressure-generating contacts movable through an additional pair of openings in the side wall of the interrupting tube, an electrically-connected pair of pressure-generating contacts supported to a side wall of the tube and cooperable with the aforesaid pair of pressure-generating contacts to establish a pair of serially related arcs, the pressure generated during opening within said interrupting tube blasting fluid through the interrupting arcs to effect their extinction, an actuating bar, and all of the movable contacts being secured to said actuating bar for simultaneous movement.

4. A fluid-blast circuit interrupter including a tank, a pair of terminal bushings extending into said tank and carrying relatively stationary contacts at their interior ends, a relatively stationary insulating interrupting tube having openings in the side wall thereof, said relatively stationary contacts being disposed externally of the interrupting tube, disposed within the tank, a pair of movable contacts movable through diametrically-located side openings in the wall of the interrupting tube and into engagement with the relatively stationary contacts, a pair of movable pressure-generating contacts movable through an additional pair of openings in the side wall of the interrupting tube, an electrically-connected pair of pressure-generating contacts supported to a side wall of the tube and cooperable with the aforesaid pair of pressure-generating contacts to establish a pair of serially related arcs, the pressure generated during opening within said interrupting tube blasting fluid through the interrupting arcs to effect their extinction, an actuating bar, all of the movable contacts being secured to said actuating bar for simultaneous movement, and a spaced pair of pivotally-mounted crank-arms linked to opposite ends of said actuating bar to effect the opening and closing movement thereof.

5. A fluid-blast circuit interrupter including a tank, a pair of terminal bushings extending into said tank and carrying relatively stationary contacts at their interior ends, an insulating interrupting tube having openings in the side wall thereof disposed within the tank, a pair of movable contacts movable through diametrically-located side openings in the wall of the interrupting tube and into engagement with the relatively stationary contacts, a pair of movable pressure-generating contacts movable through an additional pair of openings in the side wall of the interrupting tube, an electrically-connected pair of pressure-generating contacts supported to a side wall of the tube and cooperable with the aforesaid pair of pressure-generating contacts to establish a pair of serially related arcs, the pressure generated during opening within said interrupting tube blasting fluid through the interrupting arcs to effect their extinction, an actuating bar, all of the movable contacts being secured to said actuating bar for simultaneous movement, an adjacently disposed channel member forming a raceway secured to said actuating bar, a pair of roller-ended, bell-crank levers with the rollers disposed within the raceway, and means including the pair of roller-ended, bell-crank levers for effecting opening and closing motion of the actuating bar.

6. A fluid-blast circuit interrupter including a tank, a pair of terminal bushings extending into said tank and carrying relatively stationary contacts at their interior ends, a relatively stationary insulating interrupting tube having openings in the side wall thereof disposed within the tank, said relatively stationary contacts being disposed externally of the interrupting tube, a pair of movable contacts movable through diametrically-located side openings in the wall of the interrupting tube and into engagement with the relatively stationary contacts, a pair of movable pressure-generating contacts movable through an additional pair of openings in the side wall of the interrupting tube, an electrically-connected pair of pressure-generating contacts supported to a side wall of the tube and cooperable with the aforesaid pair of pressure-generating contacts to establish a pair of serially related arcs, the pressure generated during opening within said interrupting tube blasting fluid through the interrupting arcs to effect their extinction, and depending arc horns connected to the relatively stationary pressure-generating contacts to effect shortening of the pressure-generating arcs during high-current interruption.

7. A fluid-blast circuit interrupter including a metallic tank, a pair of terminal bushings extending into said metallic tank and carrying relatively stationary contacts at their interior ends, means supporting a relatively stationary insulating interrupting tube within the metallic tank having closed end portions, said pair of relatively stationary contacts being situated externally of the relatively stationary insulating interrupting tube in free space, the interrupting tube having a spaced pair of diametrically-disposed side openings in the wall thereof, a pair of rod-shaped movable contacts movable through said spaced pair of side openings into contacting engagement with said pair of relatively stationary contacts, and series contact means disposed intermediate said rod-shaped movable contacts for generating pressure within the insulating interrupting tube, whereby fluid blasting will occur out of the tube through the pair of spaced side openings adjacent the relatively stationary contacts.

8. A fluid-blast circuit interrupter including a metallic tank, a pair of terminal bushings extending into said metallic tank and carrying relatively stationary contacts at their interior ends, means supporting a relatively stationary insulating interrupting tube within the metallic tank, said pair of relatively stationary contacts being situated externally of the relatively stationary insulating interrupting tube, the interrupting tube having a spaced pair of diametrically-disposed side openings in the wall thereof, a pair of U-shaped movable contacts, relatively stationary pressure-generating contact means fixedly secured to an inner wall of the interrupting tube, an additional pair of side openings on the opposite wall of the interrupting tube, each U-shaped movable contact including an elongated interrupting rod-shaped contact and a relatively shorter rod-shaped pressure-generating contact, and movable operating means for effecting simultaneous movement of the two U-shaped movable contacts transversely of the interrupting tube.

9. A fluid-blast circuit interrupter including a metallic tank, a pair of terminal bushings extending into said metallic tank and carrying relatively stationary contacts at their interior ends, means supporting a relatively stationary insulating interrupting tube within the metallic tank, said pair of relatively stationary contacts being situated externally of the relatively stationary insulating interrupting tube, the interrupting tube having a spaced pair of diametrically-disposed side openings in the wall thereof, a pair of U-shaped movable contacts, relatively stationary pressure-generating contact means fixedly secured to an inner wall of the interrupting tube, an additional pair of side openings on the opposite wall of the interrupting tube, each U-shaped movable contact including an elongated interrupting rod-shaped contact and a relatively shorter rod-shaped pressure-generating contact, and movable operating means for effecting simultaneous movement of the two U-shaped movable contacts transversely of the interrupting tube, and a pair of generally tubular orifice-type interrupting structures disposed within said spaced pair of diametrically-disposed side openings.

References Cited in the file of this patent

UNITED STATES PATENTS

| | | |
|---|---|---|
| 1,068,588 | Jacobs | July 29, 1913 |
| 1,523,631 | Carpentier | Jan. 20, 1925 |
| 1,824,903 | Kuhns et al. | Sept. 29, 1931 |
| 1,967,996 | Bresson | July 24, 1934 |
| 2,292,547 | Sadler | Apr. 11, 1942 |
| 2,627,566 | Leeds | Feb. 3, 1953 |
| 2,717,293 | Titus et al. | Sept. 6, 1955 |
| 2,747,055 | Forwald | May 22, 1956 |
| 2,933,576 | Friedrich | Apr. 19, 1960 |

FOREIGN PATENTS

| | | |
|---|---|---|
| 331,406 | Germany | Jan. 6, 1921 |
| 394,741 | Great Britain | July 6, 1933 |
| 545,761 | Germany | Mar. 5, 1932 |
| 661,181 | Germany | June 13, 1938 |